Dec. 30, 1941.    N. W. BOSTEN    2,267,707
AUTOMOBILE HEADLIGHT ADAPTER SUPPORT
Filed Jan. 18, 1940    2 Sheets-Sheet 1

INVENTOR.
NORMAN W. BOSTEN
BY
ATTORNEYS

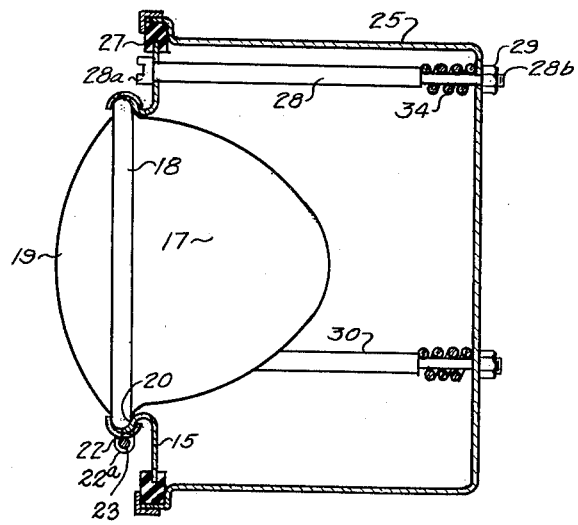
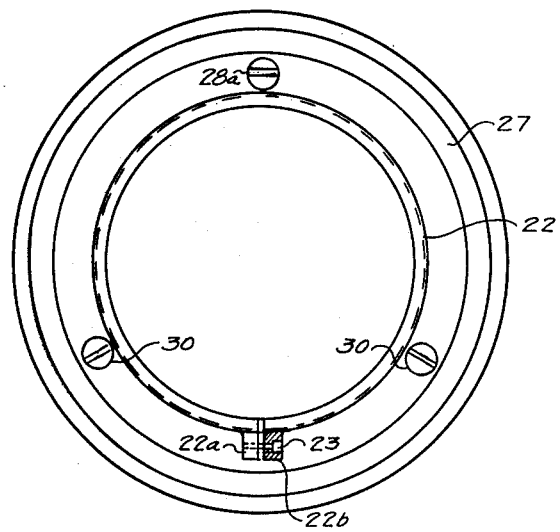
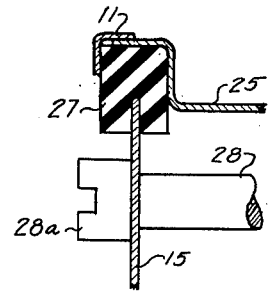

Patented Dec. 30, 1941

2,267,707

UNITED STATES PATENT OFFICE 2,267,707

AUTOMOBILE HEADLIGHT ADAPTER SUPPORT

Norman W. Bosten, Cleveland, Ohio

Application January 18, 1940, Serial No. 314,461

1 Claim. (Cl. 240—41.5)

This invention is concerned with automobile headlights and has for its general object the provision of an adapter device which can be utilized to permit the installation of the currently modern type of automobile headlight known as a "sealed beam light" in the bodies of older type headlights without requiring any reconstruction work.

For a number of years it has been the practice to provide headlights on automobiles comprising lamp structures which are supported by brackets secured to the fenders or at some other place on the forward part of the automobile, and in recent years several of the popular makes of automobiles have incorporated the lamp structures within the fenders whereby only a finishing frame or molding and a lens are exposed. Recently a highly efficient headlight for automobiles has been developed, comprising a gas sealed assembly of a lens, a parabolically shaped body, a lamp or filament and the conventional connections therefor. The entire structure, with the exception of the electrical connections, usually is formed of glass and the interior of the sealed beam unit is atmospherically sealed. When such units are used on automobiles of present-day construction, suitable mountings for the units are built into the fender construction or other forward parts of the automobile. The illuminating efficiency of the sealed beam unit type of automobile headlight is so strikingly apparent when compared to the illuminating performance of the older types of headlight structures, that a desire for the use thereof on automobiles now in operation, without necessitating expensive built-in reconstructions, has been created. Accordingly, the purpose of my present invention is to provide a holder for a sealed beam type of automobile headlight which can be readily fitted to and take the place of the lens of the older type automobile headlight in a practical, economical manner.

The arrangement is such that the sealed beam unit will be firmly supported in the old type headlight body and if desired may be adjusted for angle of elevation of the beam, as well as sidewise projection.

Figure 1:
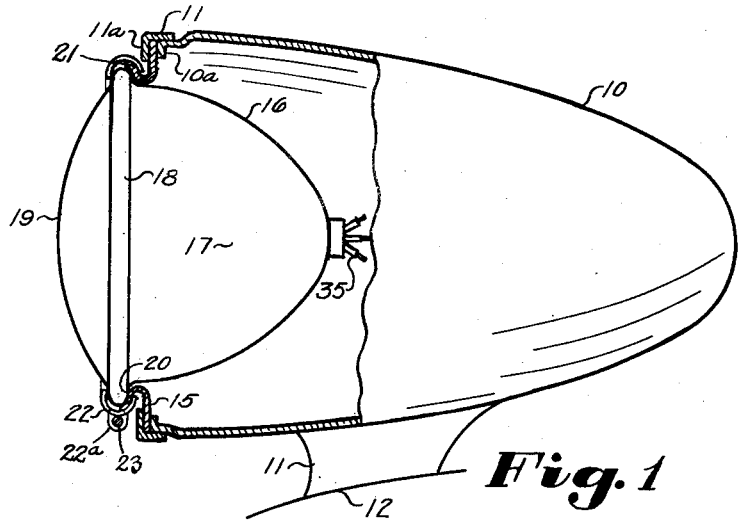
Figure 3:
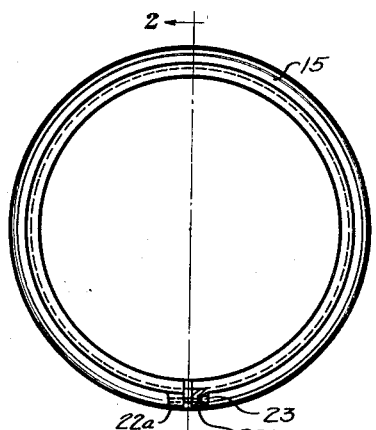
Figure 2:
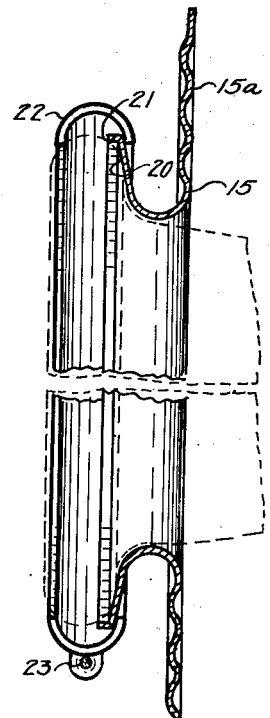

In the drawings, Fig. 1 is a side elevation of a lamp body or casing of the conventional type, shown partly in cross-section to illustrate a sealed beam unit mounted in operative position therein; Fig. 2 is an enlarged cross-sectional elevation of a sealed beam unit support or adapter of slightly modified form; Fig. 3 is a frontal view of the structure shown in Fig. 1; Fig. 4 shows a modified form of an embodiment of my invention; Fig. 5 is a frontal view of the structure shown in Fig. 4 and Fig. 6 is an enlarged cross-sectional view of the adapter means incorporated in the structure shown in Fig. 4.

In the drawings I show in Fig. 1 a lamp body or casing 10 of a well known shape and size carried by a bracket 11 mounted on an automobile fender 12. The conventional reflector structure and the conventional lamp socket connections are not shown in the lamp body 10, for it is contemplated that the same may be removed when using my invention. The forward lens supporting end of the lamp body 10 is formed in various ways, depending upon the manufacturing source of the headlight. In the illustration in Fig. 1, the simplest form of lens-retaining means is illustrated and comprises an inwardly turned flange 10a and an annular member 11 fitted to the lamp body and provided with an inwardly extending flange 11a. The perimeter of the conventional lens is disposed between the flanges 11a and 10a. The member 11 may be held in place upon the lamp body in various ways, such as a bayonet lock connection, screws, etc., none of which are illustrated in the present drawings.

The sealed beam unit 17 is of such diameter that the entire unit may be fitted within lamp bodies of standard designs and I provide a holder or adapter which, as shown, comprises a disk or plate 15 having a central opening slightly larger than the major diameter of the parabolically formed part 16 of the body of the sealed beam unit. The unit 17 has an annular shoulder or peripheral bead 18 formed thereon comprising a fused joint between the lens 19 of the unit and the body 16 of the unit. A forwardly projecting flange 21 surrounds the central opening in the plate or disk 15 and is shaped to provide a seat 20 against which the shoulder or bead 18 of the unit may seat or rest. A resilient transversely split clamping ring or band 22 that is formed to provide an inwardly facing channel is contracted about the bead 18 and flange 21 by a screw member 23 engaging boss ends or lugs 22a and 22b formed on the band structure 22 on opposite sides of the transverse split thereof.

In this simple form of an embodiment of my invention it will be apparent that the disk 15 may be formed to have a diameter corresponding substantially to the diameter of the conventional lens of the lamp body 10, and may be fitted into the position occupied by the conventional lens, as shown in Fig. 1, with the sealed beam unit 17 supported in the operative position shown.

In Fig. 2 the disk or plate 15 is shown as being formed with several annularly extending corrugations 15a, whereby the disk may be formed of light gauge metal while having sufficient strength to properly support the sealed beam unit 17 under rough road conditions, and the disk 15 may be of sufficient diameter to fit the largest size of standard lamp bodies and may cut down to fit standard lamp bodies of smaller diameters.

It will be understood that the rim of the plate or disk member 15 may be any desired shape to correspond generally to the shape of the lens which will be removed from the conventional lamp assembly when the sealed beam unit is being installed.

In Fig. 4 of the drawings I show a modification of my invention wherein the same is adaptable for installation to operate on busses and trucks, and where the lamp bodies or casings are usually built into the body of the busses and trucks. The lamp body or casing 25 is shown as being box-shaped. In this construction of the adapter, the outer diameter thereof is substantially less than the diameter of the conventional lamp and is fitted into a groove formed into an annular resilient member 27, which is adapted to occupy the place of the conventional lamp lens. Adjustable means is provided which may be simple in form and comprise a screw member 28 having the forward end 28a thereof exposed and accessible. The rear threaded end 28b thereof is fitted into a nut 29, secured to the rear wall of the body 25. The screw member 28 has positioned thereon a spring 34 which is compressed between a shoulder formed on the screw and the inner face of the rear wall of the body 25. The disposition of the screw member 28 is in a vertical plane and is disposed above the sealed beam unit 17. Two equi-distantly spaced adjusting screw members 30 of the same form as the screw 28 are shown as being disposed below and on each side of the center of the sealed beam unit 17. By adjusting the screw member 28 the angle of the beam elevation of the unit 17 relative to the road may be adjusted and by adjusting the screw members 30 a sidewise beam angle adjustment may be obtained. The spring members 34 serve to maintain the screws in the adjusted position and the use of the resilient ring 27 permits of such adjustment and serves to absorb some shocks to the filaments of the unit 17 when rough roads are to be travelled by the vehicle.

It will be obvious that by the use of the adapter device disclosed in the present application, automobile headlights of the sealed beam type may be installed on the vehicle in a very convenient and efficient manner without necessitating the discarding of the complete conventional headlight equipment, and the installation can be effected in a very efficacious manner, since the terminals of the electrical connections of the vehicle wiring system for the conventional lamp socket can be connected directly to the terminals 35 of the sealed beam unit, and the adapter parts and unit can thereafter be assembled in an efficacious manner.

I claim:

In an automobile headlight, the combination of a casing having an open forward end formed with a flange, a sealed lamp unit comprising a reflector, a lens and a lamp filament, an adapter for said lamp unit comprising a plate, a resilient ring surrounding the edge thereof and engaging the flange of the casing, said plate having an outwardly flared flange projecting forwardly from the casing and defining a central opening in the plate in which the lamp unit is supported, a clamp engaging said lamp unit and plate flange for securing said lamp unit in the adapter, adjustable means extending through the casing and engaging said plate for adjusting the angle of the light beam from said lamp unit, and means for securing the resilient ring to the casing.

NORMAN W. BOSTEN.